March 18, 1958   TAKUZO TSUCHIYA ET AL   2,827,157
SPIRAL VIBRATORY CONVEYOR

Filed March 10, 1954   6 Sheets-Sheet 1

INVENTOR.
TAKUZO TSUCHIYA
GEORGE LONG

By William C. Stueber   ATTORNEY

March 18, 1958 TAKUZO TSUCHIYA ET AL 2,827,157
SPIRAL VIBRATORY CONVEYOR
Filed March 10, 1954 6 Sheets-Sheet 3

INVENTOR.
TAKUZO TSUCHIYA
GEORGE LONG

By William C. Strueber ATTORNEY

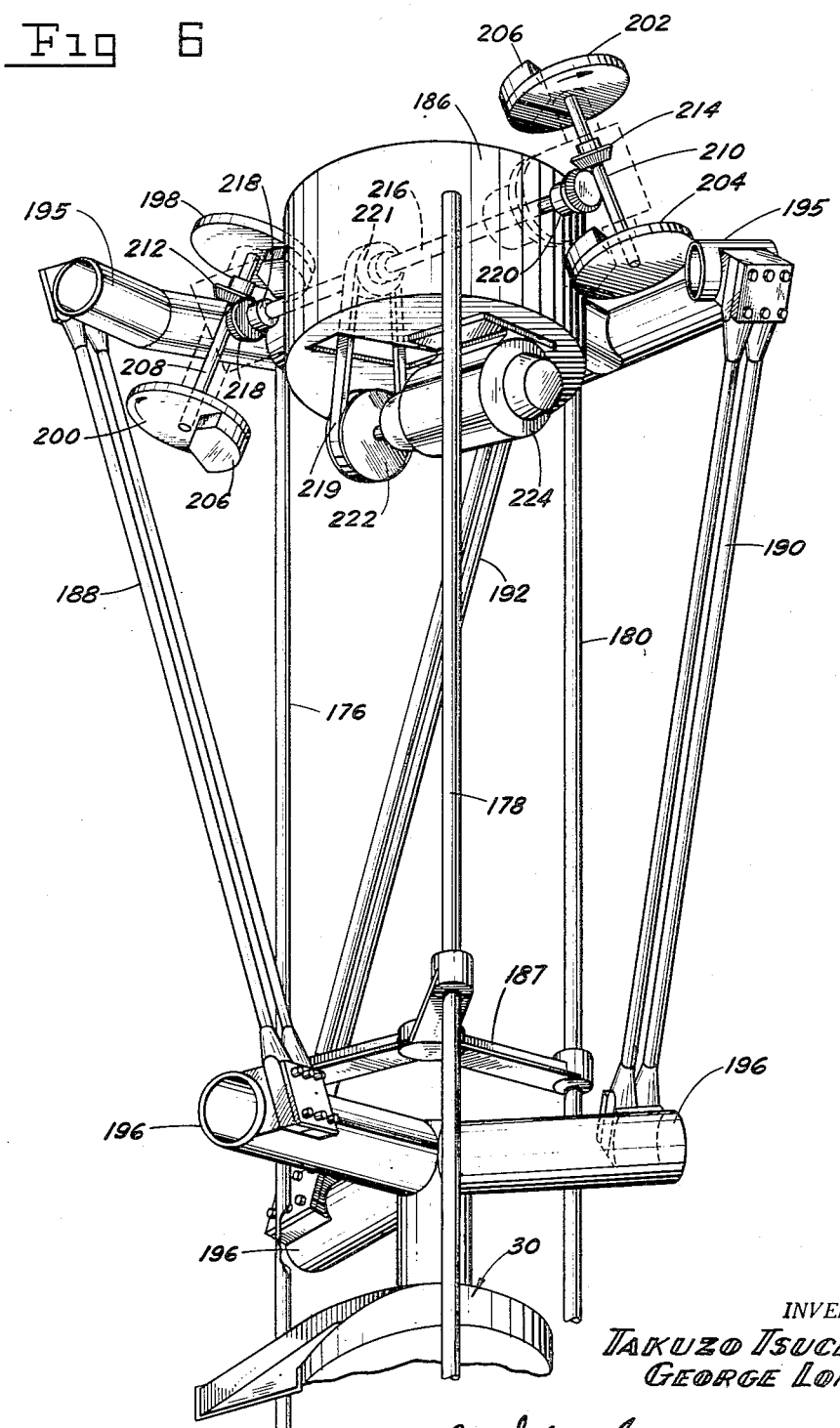

March 18, 1958  TAKUZO TSUCHIYA ET AL  2,827,157
SPIRAL VIBRATORY CONVEYOR
Filed March 10, 1954  6 Sheets-Sheet 5
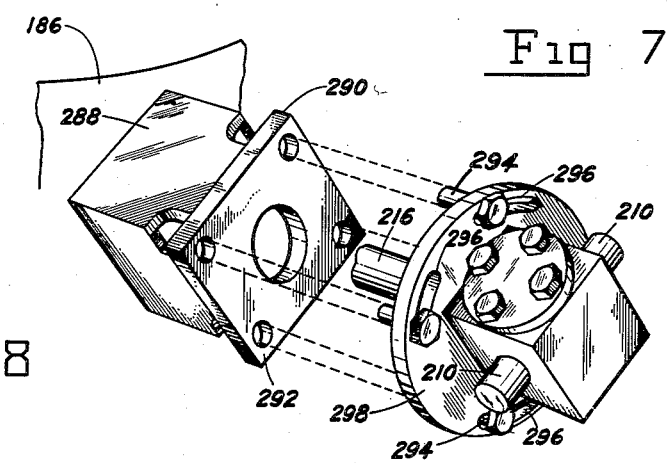
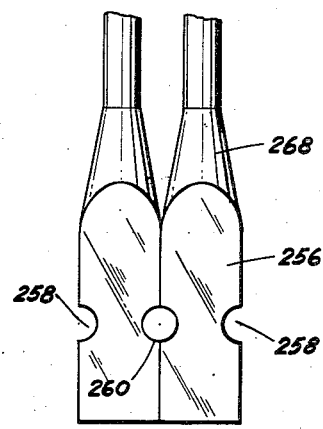
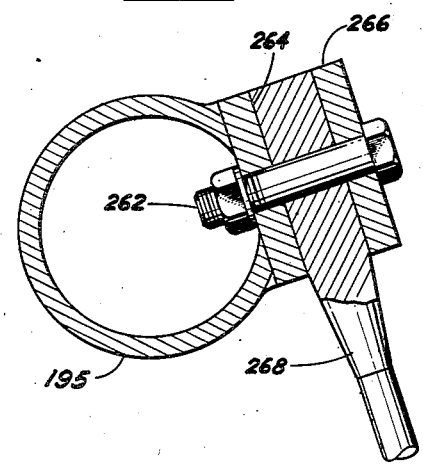
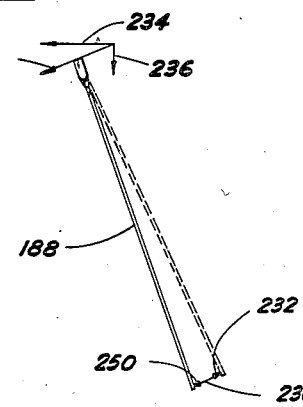
INVENTOR.
TAKUZO TSUCHIYA
GEORGE LONG
BY William C. Stueber
ATTORNEY March 18, 1958  TAKUZO TSUCHIYA ET AL  2,827,157
SPIRAL VIBRATORY CONVEYOR Filed March 10, 1954  6 Sheets-Sheet 6

INVENTOR.
TAKUZO TSUCHIYA
GEORGE LONG
By William C. Strueber
ATTORNEY

United States Patent Office 2,827,157
Patented Mar. 18, 1958

2,827,157

SPIRAL VIBRATORY CONVEYOR

Takuzo Tsuchiya and George Long, Minneapolis, Minn., assignors to General Mills, Inc., a corporation of Delaware Application March 10, 1954, Serial No. 415,314

24 Claims. (Cl. 198—220)

The present invention relates to improvements in vibratory conveyors and more specifically to an improved system for imparting a vibratory movement to a helical conveyor to carry a solid material along a helical path uually from a lower to a higher elevation.

Conveyors which carry solid material upwardly along a spiral or helical path have been previously known to the conveying art. These conveyors are given a vibration moving the conveyor in a rotary oscillation about the conveyor axis which has a vertical component of movement to cause the material to travel uphill along the spiral path and to be discharged at a higher level. It will be appreciated that in such a conveyor which is to operate continuously the vibratory force may impart a considerable vibration to the conveyor support and considerable wear to any moving parts. Further, because of the severe vibrations required, the parts normally must be made relatively heavy so that failure of the related structural parts does not occur. This of course increases the bulkiness of the machine and also increases the expense considerably.

Further, because of the vibrations transmitted to the support such as a building floor, it is frequently impractical to use this type of conveyor unless the building and floor are extremely rigid and have considerable mass.

In these vibratory conveyors the vibratory force is frequently applied directly to the conveyor with the conveyor being spring mounted to permit it to vibrate. The vibrations are assimilated by springs but equal and opposite reactant forces are transmitted to the supporting base or stand causing a vibration of the base and the floor. In other conveyors the vibratory force is obtained by a direct mechanical connection between a vibrator which is mounted on the base or the floor and the suspended conveyor. This again creates reactant forces which are transmitted by the vibrator to the base or the floor.

It is accordingly an objective of the invention to provide a spiral vibratory conveyor in which very minimum vibratory forces are transmitted to the support and the forces are assimilated in the mechanism itself without the creation of equal and opposite reactant forces which must be transmitted to the supporting base or floor.

A further object of the invention is the provision of a spiral vibratory conveyor which is supported by spring beams which are secured to an intermediate base with the intermediate base in turn supported by other spring beams.

Another object of the invention is to provide a spiral vibratory conveyor in which the conveyor is solely supported by spring beams extending at an angle to the helical path of the conveyed material and connected from an intermediate base which carries a cyclical torque applying means to vibrate the conveyor with the intermediate base being supported by other spring beams projecting substantially vertical from either a floor or overhead support.

Another object of the invention is to provide a helical conveyor in which vertical forces are counteracted so that they are not transmitted to the building in which the conveyor is supported.

A still further object of the invention is to provide a spiral vibratory conveyor which is supported by spring beams secured to an intermediate base which carries both an apparatus for creating a cyclical torque about the conveyor axis and an apparatus for creating a vertical cyclical force to counteract and cancel vertical inertia forces of the conveyor.

A further object of the invention is to provide a spiral conveyor system supported on an intermediate base with an improved set of spring beams extending between the intermediate base and the conveyor which will greatly reduce or minimize the effects of twist and will have a longer operating life.

Another object of the invention is to provide a force applying means for the intermediate base supporting the helical conveyor on springs which creates a cyclical torque about the axis of the conveyor and an additional vertical cyclical force to cancel the vertical inertia forces of the conveyor with the ratio between the torque and vertical forces being adjustable.

Other objects and advantages will become apparent in the following specification taken in connection with the appended drawings in which:

Figure 1 is a perspective view of the spiral conveyor assembly illustrating one embodiment of the invention;

Fig. 2 is a sectional view taken along line 2—2 of Fig. 1;

Fig. 6 is a more detailed view of the upper portion of the conveyor of Fig. 4;

Fig. 7 is an enlarged detail of the mechanism which enables adjusting the angle of the axis of the rotating unbalanced weights to adjust the ratio between the forces creating a torque and a vertical force;

Fig. 8 is an enlarged detailed view of the ends of the improved spring beams;

Fig. 9 is another enlarged detailed view partially in section to illustrate the manner of securing the spring beams to the conveyor or to the intermediate base;

Fig. 10 is a diagrammatic view illustrating the path of movement of the conveyor spring and the inertia forces of the conveyor; and, Fig. 11 is a perspective view of another embodiment of the principles of the spiral conveyor of the present invention.

Figure 3:
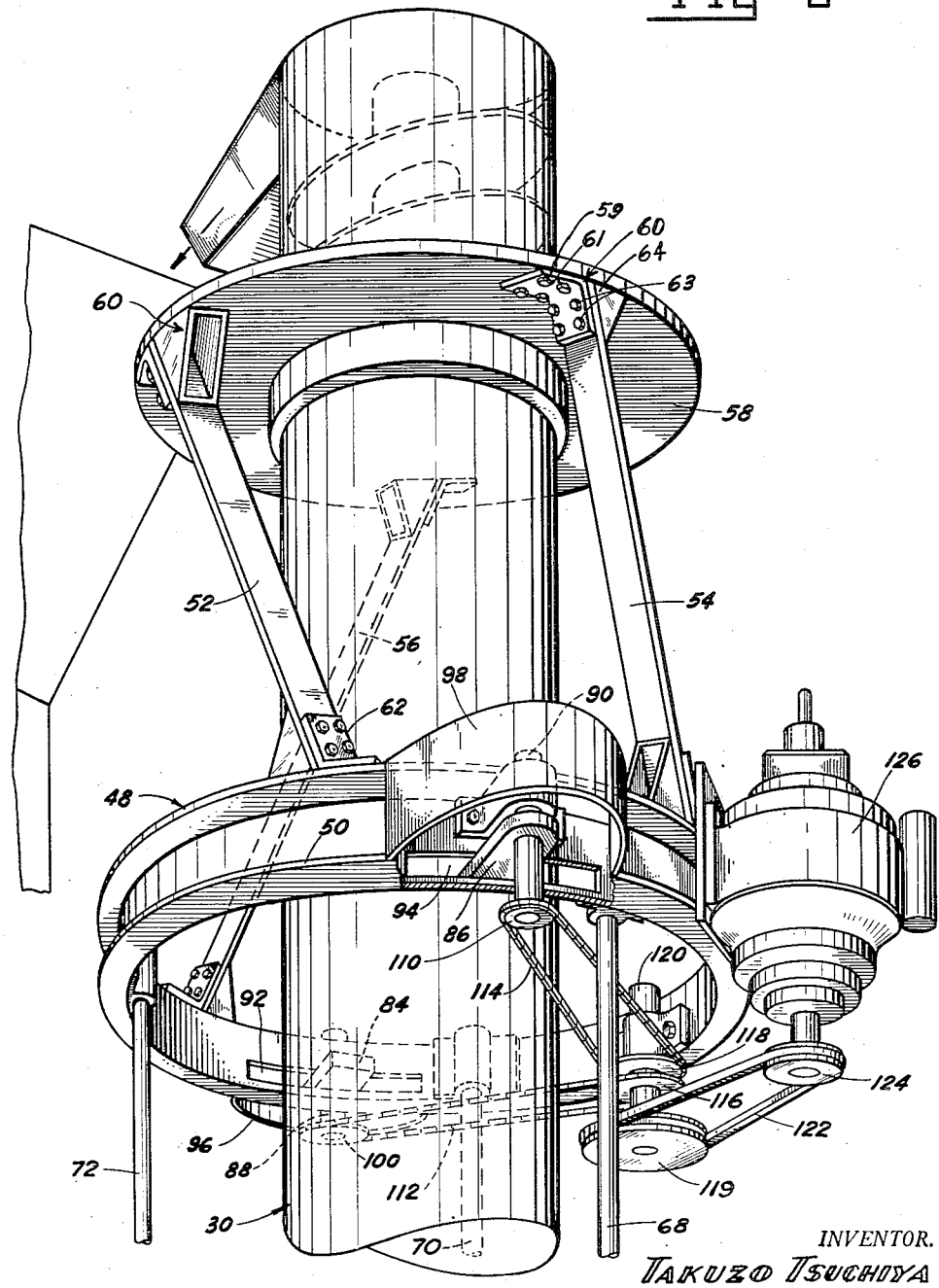
Fig. 3 is an enlarged view of the upper portion of the conveyor of Fig. 1.

As illustrated in the drawings, the present invention is designed primarily for use for conveying materials from a lower to a higher level through a spiral or helical path.

One form of the spiral conveyor is shown in Fig. 1. The material enters the spiral conveyor at 20 to be conveyed upwardly in a helical path following the arrows 22. When the material has circled upwardly to the top 24 of the conveyor column, it is discharged through the discharge spout 26 into a receiving container 28.

The material is caused to be moved upwardly by the vibrations of the conveyor, shown generally at 30, which take the form of rotational oscillations in which the forward or backward movement of any point on the conveyor moves at an angle steeper than $\theta$ (shown at 64), which is the angle of incline of the helix 32 which forms the floor of the conveyor. This movement causes the material to be thrown upward and forward with each forward movement of the conveyor so that it moves upwardly along the spiral confines of the conveyor. The movement of the conveyor is illustrated by the arrows 66 shown in Fig. 1. It will be seen that this path of movement is at right angles to the tops of the springs 52, 54 and 56, which remain substantially stationary at their lower ends.

Although the conveyor is designed primarily for conveying materials uphill, it may be put to other uses following the principles of the invention. For example, the conveyor may be designed to convey materials downhill at a controlled rate. In that case the conveyor will move upwardly and back in its rotary oscillating vibrations at an angle less than $\theta$, as shown at 64 in the drawings. This angle at which the conveyor vibrates is determined by the angle at which the supporting spring beams 52, 54 and 56 are connected to the conveyor as will be later explained.

The conveyor tube for carrying the material may be described in Fig. 1 as comprising a cylindrical tube 31 which may be formed of sheet metal or similar suitable material. The tube surrounds a sheet metal floor 32 which is cut in a helix to define a spiral path winding upwardly around a central column 34 which extends the full height of the conveyor tube and is located concentrically within the outer shell 31. The top and bottom ends of the outer shell are closed by circular discs 36 and 37 of material with the central column 34 being attached at the center of the discs.

Figure 4:
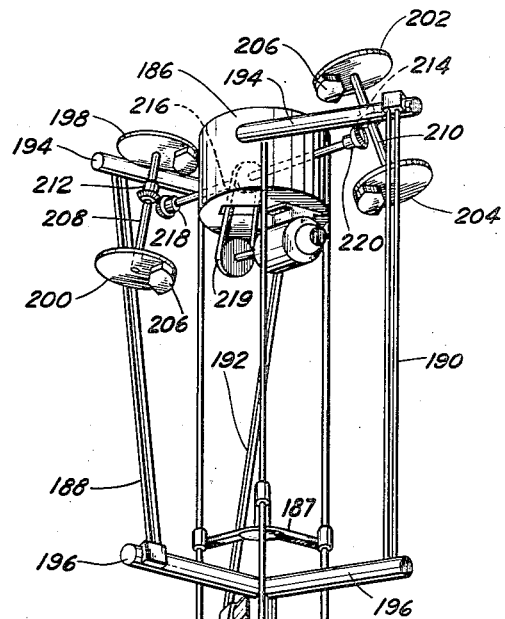
Fig. 4 is a perspective view illustrating another embodiment of the invention with means provided for annulling the vertical inertia forces of the conveyor.

In Fig. 4 an alternate form of helical conveyor tube is shown. The conveyor tubes or elevators illustrated are shown for purposes of example only and it will be apparent later in the specification that the invention is not limited to any particular type of spiral conveyor but may be used with various forms.

The conveyor of Fig. 4, again shown generally at the numeral 30, has a central cylindrical column 36 about which a conveying channel 38 is helically wrapped. The channel is comprised of a floor 40 slanting helically upward and an outer vertical confining wall 42 secured at the outer edge of the helical floor. The vertical wall 42 comprises the outer wall of the channel with the inner wall being the center column 36. A feeder pan 43 is located at the bottom of the conveyor to receive material from a supply spout 44. A delivery spout 46 is attached at the top of the conveyor 30 to deliver the material to bin 28.

Next will be described the structure which supports the conveyor and the devices which give the conveyor its vibratory motion and which function to balance out the vibrations and acceleration forces so they are not transmitted to the building in which the conveyor is housed. These supporting, operating, and vibration reducing elements of the conveyor are the first set of inclined spring beams which support the conveyor and permit it to vibrate for conveying; an intermediate base which carries the spring beams and which also carries a cyclical torque applying means to give vibratory movement to the conveyor and a force applying means to cancel the reactance forces; and a second set of spring beams to support the intermediate base from the floor or ceiling of the building. From the above structure the system may be generally termed a two-mass, two spring helical conveyor. The conveyor and intermediate base comprise the two masses and the first spring beams supporting the conveyor from the intermediate base, and the second spring beams supporting the intermediate base from the floor comprising the two springs.

The intermediate base member is indicated generally at 48 in Figs. 1, 2 and 3 and is shown in the form of an annular ring 50 which encircles the helical conveyor tube 30. The ring may be either rectangular or U-shaped in cross section as shown in Figs. 1 and 3 respectively. In other embodiments as will be described later, the intermediate base member may be arranged above the conveyor but its shape in this embodiment is annular to permit the conveyor tube to pass through. In this embodiment the supporting and operating mechanism is arranged around the spiral conveyor tube and the conveyor therefore can extend for some distance past the operating mechanism. This is advantageous in instances where head room is at a premium such as where the conveyor discharge must be near the ceiling. In this arrangement the mechanism can be neatly arranged around the conveyor tube and can be located in a remarkably small space.

To support the conveyor from the intermediate base 48 a first set of spring beams is provided. In the simplified construction the set of beams includes three flattened springs 52, 54 and 56 which are rigidly clamped at their bottom ends to the annular ring 50 and at their upper ends to a circular flange 58 which is secured to the conveyor tube for supporting it. Each end of each of the spring beams is clamped to the flange 58 and also to the intermediate base 48 by a casting assembly and only one need be described. The casting assemblies such as that shown at 60 in Fig. 3 have a bracket 59 which is rigidly secured to the flange 58 such as by bolts 61 and has the spring beams secured to it by bolts 63, the bolts also extending through the angle block 64. The angle of the bracket 59 and shape of block 64 determine the angle at which the springs are connected to the conveyor and hence the angle of vibration of the conveyor. A similar casting assembly is provided for each end of the spring beams 52, 54 and 56.

While both ends of the spring beams are shown rigidly connected, it is only necessary that one end of each spring be secured and pivotal connections could be used at the other ends. In such a case, however, four times the number of spring beams would be needed for the same resilience.

Thus, the first set of spring beams provides the sole supporting or weight bearing connection between the conveying member and intermediate base. It will be noted that the spring beams are inclined. The angle of beams is such that the beams are inclined with respect to the path of feed of material. To put it another way, the angle of the beam 52 in Fig. 1 is such that the path of movement of the conveyor floor, as indicated by the arrows 66, will be at a greater angle than the angle of incline $\theta$ of the conveyor floor. Thus the angle of the beams with the vertical is also greater than the angle $\theta$. This causes the material to be thrown upward and forward when the conveyor vibrates.

Thus the path of vibratory movement of the conveyor is dictated by the path of movement of the upper ends of the spring beams 52, the intermediate base 48 remaining relatively stationary during the conveying operation. The vibratory movement of the conveyor tube is in the form of an upward and forward and downward and backward rotary oscillation about the central axis of the helix. The actual path of relative movement is more in the nature of an arc, but for small displacements of vibration along this path it may be considered almost at a straight line. The path of movement and return is indicated by the arrow 66 of Fig. 1.

A feature of the invention is the support of the intermediate base 48. This base is supported by a second set of spring beams 68, 70 and 72 which are illustrated in the form of round rods. In this illustration the rods are reinforced at their lower ends by being thicker at the lower end 74 as illustrated by rod 68. This extra thickness increases their strength so that they will not buckle with the weight of the conveyor. These rods or second set of spring beams 68, 70 and 72 are secured to the intermediate base by rigid clamps 76, 78 and 80, respectively. The $k$ factor of the beams or stiffness factor considering them as springs, is important and will be discussed later. The beams extend vertically from the intermediate base to a suitable support base 81 which rests on the floor 82 of the building. The beams or rods of course may be anchored directly to the floor but as shown, the conveyor may be transported from place to place to comprise a self contained unit.

Although the second spring beams are vertical, in some cases other supports for the intermediate base would be acceptable. Supports which carry the intermediate base and which are resilient to torsional forces on the intermediate base are operable where no forces are present which would tend to cause a tipping of the conveyor about a horizontal axis.

According to the preferred form of the present invention, the vertical rods or second set of spring beams are non-extensible and non-compressible in a vertical direction thus preventing any rocking of the operating mechanism and conveyor to result in unstable operation which might possibly tip over the entire conveyor. With respect to this point, it may be said that the spacing of the lower vertical beams or rods from the conveyor axis and the size of the annular ring forming the intermediate base is a matter of design but it should be such that the conveyor will not accidentally be tipped. This is of course dependent upon the height of the conveyor, the position of the center of gravity, etc. Further, the overall $k$, which is the torsional $k$, of both the upper first set of spring beams and the lower second set is dependent on their distance from the axial center of the conveyor.

In general the spring constant $k_2$ for the lower springs should be small to reduce the horizontal forces and to displace the first critical frequency of the system toward the lower end of the frequency range. This reduces the chances of undesired vibration as the machine is shut down and the frequency decreases. In case of large product damping or other damping, a smaller resilience $k_2$ will reduce the force transmission to the foundation. At the same time, however, this resilience $k_2$ of the lower springs must be great enough to support the system as a whole. Within these general principles, the spring constant $k_2$ should be less than the spring constant $k_1$ for the first set of springs, and preferably less than one-fourth of the spring constant $k_1$, while in general, the masses $m_1$ and $m_2$ of the conveyor and intermediate base are of the same order of magnitude.

To obtain the desired vibration of the conveyor, which as before stated is in the form of a rotational oscillation with the movement of the conveyor being perpendicular to the angle of the first set of spring beams, suitable force impulses are applied solely to the intermediate base member. This force is obtained by a self contained device capable of applying a cyclical torque obtained from cyclical forces tangential to the path of feed of the conveyor tube.

An illustration of an apparatus for applying such a torque includes a pair of rotating unbalanced weights 84 and 86, Figs. 1, 2 and 3, which rotate on vertical shafts 88 and 90. Slots 92 and 94 are cut in the annular ring 50 so that the weights will have freedom of rotation. A pair of guards 96 and 98 may be secured to the annular ring to extend around the weights to protect personnel.

For driving the weights the lower ends of the shafts 88 and 90 are provided with pulleys 100 and 110 which are driven by belts 112 and 114 respectively. These belts are of the type known to the art as timing belts in which the pulley will be positively driven so that the two weights 84 and 86 will be kept in the proper phase relationship. The belts are driven from pulleys 116 and 118 mounted on a common shaft 120. All the shafts are suitably supported on bearings on the ring 50 of the intermediate base. The shaft is driven by V-pulley 119 driven by V-belt 122, which in turn is driven by V-pulley 124 carried on the shaft of motor 126. The motor is supplied with electricity by a suitable cord, not shown. For adjusting the speed at which the weights rotate and apply the torque to the intermediate base the speed of the motor 126 is controlled or the speed of the weights is properly adjusted by previous choice of sizes of driving pulleys.

The weights 84 and 86 rotate in the same direction 180° out of phase. As may be seen by studying Fig. 2, the forces of the weights cancel out in a radial direction but augment each other tangential to the conveyor axis, thus applying a reversing torque about the central axis for each revolution of the weights.

According to the invention the frequency of torque impulses applied to the intermediate base 48 is adjusted approximately in the range of the natural frequency of the system. The system includes the conveying member 30 and the first set of supporting spring beams 52, 54 and 56.

The natural frequency of the system is defined by the formula $$p = \sqrt{\frac{k_1}{I_1}}$$

where $k_1$ is the torsional spring constant of the upper spring beams and $I_1$ is the moment of inertia of the effective mass of the conveying member and the first spring beams about the vertical axis through the center of gravity of the conveyor.

By operation at exactly this frequency it is theoretically possible (by ignoring frictional or product damping and other factors) to reduce the oscillating movement or horizontal movement of the intermediate base 48 to zero. In other words, the horizontal or torque applying components of force applied by the eccentric weights 84 and 86 will be balanced or neutralized at any given instant by equal and opposite forces resulting from the relative deflection of the first set of spring beams along said inclined rotational path 66 and the conveying member 30. In this way forces applied to the intermediate base member 48 result in the desired conveying vibrations of the conveying member 30 without substantially horizontal rotation or movement of the intermediate base 48.

To the extent that this intermediate base 48 remains stationary no torque or other horizontal force impulses will be transmitted to the foundation 82 by the second set of supporting spring beams 68, 70 and 72 since such springs will remain undeflected.

In actual use a system of the type shown in the drawings which show examples embodying the present invention involves not only pure primary forces such as those applied by the unbalanced rotating weights 84 and 86 and the motion of the conveyor, but involves secondary forces due primarily to the material carried on the conveyor and which may be considered as frictional or damping in nature. These additional effects may result in some vibration or rotational oscillation of the intermediate base 48 and may require operation of the rotating unbalanced weights at a frequency slightly different from the above so-called natural frequency of the system. The direction and extent of this variation in the force frequency can be readily determined in a given case either by consideration of the theoretical analysis given below or by simple test in actual operation.

We have stated that $$p = \sqrt{\frac{k_1}{I_1}}$$

is the undamped natural frequency of the $I_1 k_1$ system. If there were no damping whatsoever, the amplitude of vibration or oscillation of the intermediate frame would be zero when the forced frequency was made equal to this undamped natural frequency.

In practice, such an ideal situation is never quite met, since damping will always be present to a greater or lesser extent. Because of this damping, which may be due to product load, air resistance or other factors, the vibration of the intermediate frame canot be reduced to zero in all cases.

Yet if the damping is relatively small compared to the critical damping of the system (i. e., if the so-called damping constant "C" is not greater than $0.25C_c$, where $C_c$=critical damping=$2\sqrt{k_1I_1}$, and depending to some extent on the actual ratios of $I_1$ to $I_2$ and $k_1$ to $k_2$), there will generally be a particular value or range of values of the forced frequency, in the immediate vicinity of the undamped natural frequency, at which the vibrations of the intermediate base will have a definite minimum. We have observed that this particular value of the forced frequency is generaly different from, and in fact somewhat less than the undamped natural frequency.

On the other hand, if the damping is relatively great compared to the critical damping, the situation may be quite different and there may be no such well defined minimum. It may even be difficult in such a case to achieve good conveying action of the working member. The damping we speak of here is the total damping in the system. This may be considered to include all types of damping as well as the mass effect of the product being conveyed.

Thus if large values of damping are anticipated, much can be done to improve the operation and minimize the vibrations of the intermediate base, the horizontal forces transmitted to the foundation, and the wear and tear on the force applying mechanism, by a careful selection of design parameters. In other words, the adverse effect of damping can be reduced by making the product of $k$ times $I$ as large as possible, consistent with other design conditions, and thus keeping the critical damping high as compared to actual damping.

In operation, the vibratory conveyor is first set to operate without load, at the undamped natural frequency. The forced frequency is then adjusted in the neighborhood of this natural frequency with the conveyor under normal load. The final working frequency is then chosen on the basis of the minimum motion of the intermediate base which is consistent with good conveying action of the working member.

It is desirable in any case that the lower spring beams 68, 70 and 72 have a sufficient vertical or longitudinal rigidity so that they prevent tilting or leaning of the conveyor. It will be apparent from the path of movement of the conveyor 30, as indicated by the arrows 66, that the conveyor moves up and down in its vibrations. The vertical acceleration of the conveyor exerts force due to the inertia of the mass which is not compensated for. In this embodiment this vertical acceleration force is transmitted through the lower set of spring beams to the floor 82. In other modifications, as shown in later drawings, a means is provided to compensate for this vertical force. Therefore the stiffness of the lower supporting beams must be adequate to support the weight of the conveyor without buckling and also to withstand these vertical inertia forces.

In the embodiments of Figs. 4 and 6 the conveyor 30 is again supported from the floor by a set of supporting spring beams 176, 178 and 180. These beams which will be referred to as the second set of beams to correspond with the disclosure of the first embodiments, extend from a suitable suport 182 on the floor 184 and are rigidly secured to the intermediate base 186. The intermediate base in this instance, instead of being in the form of an annular ring as in the case of Figs. 1 and 3, is in the shape of a drum. A stiffening member 187 may be added to connect the three spring beams 176, 178 and 180 to reduce possibility of vibration during operation.

Figure 5:
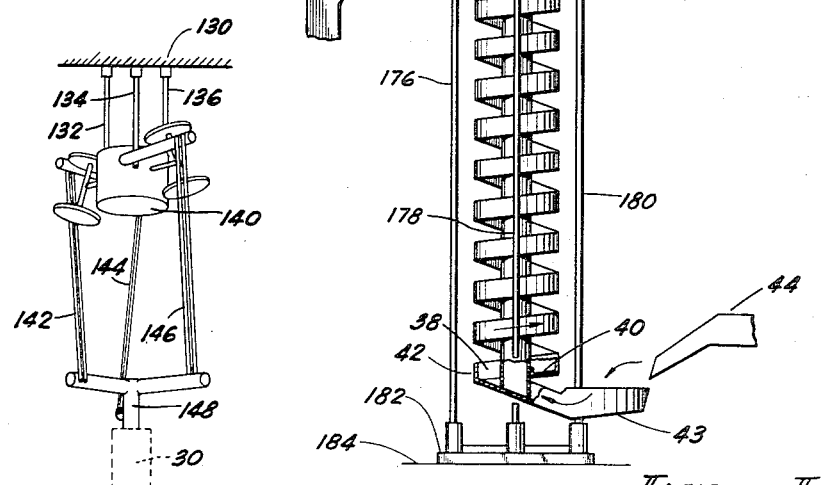
Fig. 5 is a perspective view of the conveyor of Fig. 4 showing it suspended from a ceiling support.

In Fig. 5 the vibratory conveyor and its associated apparatus is shown suspended from an overhead support such as the ceiling 130. The second set of beams 132, 134 and 136 are anchored to the ceiling in contrast to Figs. 1–3 or 4 and 6 where the second set of beams supports the conveyor from the floor. It will be noted in this instance that the $k$ factor of this second set of beams may be much less than in Figs. 4 and 6 because rigidity to prevent the beams from bending with the weight of the conveyor and load need not be considered. Since the weight of the conveyor pulls downwardly on the spring beams 132, 134 and 136, they need only sufficient tensile strength to carry the weight of the conveyor and its operating mechanism and to keep away from harmonic frequencies.

At the lower end of the spring beams 132, 134 and 136 is attached the intermediate base 140. To support the conveyor from the intermediate base 140 a first set of spring beams 142, 144 and 146 are suitably secured at their upper ends to the lower surface of intermediate base 140 and at their lower ends to a projection 148 at the top of the conveyor 30. With the exception of the ceiling support the structure of the conveyor of Fig. 5 is substantially the same as that of Figs. 4 and 6.

The conveyor of Figs. 4 and 6 is supported from the intermediate base 186 by the first set of upper spring beams 188, 190 and 192. The drawings illustrate two types of spring beams which are substantially the same and which are identified by the same numerals although the spring beams of Fig. 6 have tapered enlarged ends. The advantages in a longer wearing life for this improvement will be discussed later.

To secure the spring beams to the drum, arms 194 in Fig. 4 or 195 in Fig. 6, extend outwardly from the intermediate base and the spring beams are attached at the ends of the arms. The arms 194 and 195 illustrate different types of arms for performing the same function of attaching the upper ends of the spring beams to the drum 186. The arms may be welded to the drum in any suitable manner and straight arms as shown in Fig. 4 or fabricated bent arms as shown in Fig. 6 may be used.

Arms 196 extend outwardly from the conveyor to which the lower ends of the spring beams are connected. It is not critical as to how far the first spring beams are located from the axial center of the conveyor except that their overall torsional $k$ is dependent on their radial distance from the center. As the spring beams are brought in closer stiffer springs must be used and if they are positioned further from the axial center, a spring having a lower linear $k$ may be employed. The linear $k$ of individual springs which is chosen in design is dependent on their distance from the conveyor axis since the torsional $k$ is equal to the linear $k$ times the distance squared of the springs from the axis of the conveyor.

Again the upper spring beams are set at an angle to the angle of feed of material on the conveyor to give it the desired upward throw as the conveyor oscillates.

To apply a torque to the intermediate base 186 for obtaining the desired movement of the conveying member 30, a set of rotating unbalanced weights are provided. The unbalanced weights consist of discs 198, 200, 202 and 204, with weights 206 shown mounted on the outer edge of the discs. The weights 206 may be carried on either side of the discs as may be seen by comparing discs 202 and 204 of Figs. 4 and 6. One pair of discs 198 and 200 is carried on a shaft 208 and the other pair 202 and 204 is carried on a shaft 210. These shafts are driven through bevel gears 212 and 214 respectively by a cross shaft 216 carrying bevel gears 218 and 220 on its outer ends. The casing for the drive gears is omitted for clarity in Fig. 4 and is shown in dotted lines in Fig. 6, whereas Fig. 7 shows this structure in detail.

The entire mechanism for applying the cyclical forces to the intermediate base is supported on the base. The shaft 216 is suitably carried for rotation on the intermediate base and is given rotation by means of a V-belt 219 driving a pulley 221 on the shaft 216, the belt being driven by a pulley 222 on the driving motor 224. Again as in previous embodiments, the speed of the motor may be controlled or else the drive ratio of the timing belt and pulleys and gears is chosen such that the unbalanced weights rotate at the natural frequency of the system.

In certain instances mechanism may be provided to be able to make adjustments to the speed of the motor to arrive at the optimum frequency during operation. The pairs of discs carrying the weights 206 rotate in the same direction but each pair is 180° out of phase with the other. Thus the horizontal forces of unbalance cancel out in a radial direction and augment each other tangential to the conveyor to obtain a cyclical torque.

An important feature of the rotating weights of Figs. 4 and 6 is that their axis of rotation is canted or set at an angle to the vertical axis of the conveyor. Thus, when the unbalanced weights rotate they not only exert a cyclical horizontal force to produce a torque about the vertical axis of the intermediate base, but they also exert a vertical cyclical force. Since the unbalanced weights rotate at the natural frequency of the system and their force is applied when the conveyor reaches the maximum limits of its travel or oscillation in each direction, these vertical forces are applied when the acceleration forces of the conveyor are maximum, i. e., the forces caused by the reversal in direction of movement of the conveyor as it vibrates.

Fig. 10 shows the locus of travel 230 of the lower end of the spring beam 188 which is attached to the conveyor. The conveyor at its maximum forward movement reaches the point indicated by the arrow 232. At this point the material on the conveyor has been thrown forward and the conveyor is about to begin to reverse its travel. Also at this point the rotating unbalanced weights 198, 200, 202 and 204 exert the force indicated by the force vector 233. This vector may be resolved into its vertical component 236 and its horizontal component 234. As the conveyor reverses its direction of travel at arrow 232 it exerts an upward acceleration force on the intermediate base. This force is counteracted by the equal and opposite force of the rotating weights as indicated by the force vector 236. This vertical force is in phase with the horizontal force 234 since both are being exerted by the same rotating unbalanced weights.

The amount of force to be exerted by the rotating unbalanced weights may be computed from the effective mass of the conveyor and the $k$ or spring constant.

Since the conveyor rotates as it vibrates, the springs are subjected to torsion as well as simple bending which makes it difficult to accurately compute their operational $k$ or spring constant. To allow for small deviations between computed values and actual values, the ratio between the vertical and horizontal forces of the unbalanced weights is made adjustable. The amount of vertical force in proportion to the horizontal force may be simply adjusted by adjusting the angle of the axis about which the unbalanced weight rotates.

This adjustment is made possible by making the position of the shafts 208 and 210 of the rotating weights adjustable with respect to the vertical axis of the conveyor and the mechanism employed for obtaining this adjustment is shown in detail in Fig. 7. The intermediate base 186 is shown with a projecting box 288 carrying a plate 290 for supporting the rotating cross shaft 216. The plate 290 has holes 292 drilled at its corners for the receiving of bolts 294. These bolts extend through arcuate slots 296 in a plate 298 which supports the gears for driving the shaft 210 on which are mounted the unbalanced weights. The plate 298 and shaft is rotationally adjustable with respect to the intermediate base by virtue of the arcuate slots 296 in the plate. The plate may be secured in any adjusted position by tightening the nuts (not shown) which are threaded to the bolts 294. By the proper adjustment of the angle of shafts 208 and 210 the vertical component of force shown by 236 in Fig. 10 may be adjusted to the proper magnitude to cancel out the vertical force of the conveyor as it reverses direction in the uppermost point in its travel. When the conveyor swings in the opposite direction and reaches the point indicated by the arrow 250, it reverses direction and exerts a downward force. This downward thrust or acceleration or inertia force is compensated for by the vertical component of force of the unbalanced weights which at this point is exerted in the upward direction.

Another feature to be noted, which is illustrated in Figs. 4, 6 and 8 is that a double spring may be used to support the intermediate base. A double spring makes it possible to use a shorter or lighter weight spring to obtain the same $k$ factor. The use of a double spring allows use of smaller, less stiff springs decreasing stresses and thereby increasing the life of the spring. It will also be noted in Figs. 4, 6 and 8 that the springs are preferably round in cross section. Because the springs must rotate or twist to accommodate the rotational movement of the conveyor while the intermediate base remains relatively stationary, a twist or torsional stress is exerted on the springs. Further since the end of the spring connected to the conveyor is at a fixed radius from the axis of the conveyor, this end moves inwardly and outwardly with respect to the end connected to the intermediate base or bends the spring in a radial direction. This may be observed by projecting the ends of the springs connected to the conveyor on the horizontal plane of the spring ends connected to the intermediate base and it will be seen that the conveyor ends move radially with respect to lines tangential to the connecting points of the intermediate base ends. Thus the flat leaf spring which is shown in Figs. 1 and 3 will be less resistant to the stress caused by the rotational vibration of the conveyor and will fail much more readily than the round spring. These springs may be solid or tubular.

Fig. 9 shows a detailed view of one means of attaching the springs to the members 195 which is in the same fashion as the lower ends of springs attached to members 196. The ends of the beams 256 are flattened and half holes 258 are drilled in the edges of the ends so that when the edges of two beams are brought together a full size hole 260 is formed. The beam ends are secured against a flattened surface 264 of the tube 195 by bolts 262 which extend through a plate 266 placed over the beam ends. The bolts also extend through holes in the flattened surface 264 of the tube and are secured by nuts threaded to the bolt ends.

The spring means, as shown in Figs. 6, 8 and 9, have an enlarged shoulder portion 268 at their ends at the point where the largest bending moment occurs and where failure of the beam is most likely to take place. This greatly increases their life.

Figure 11:
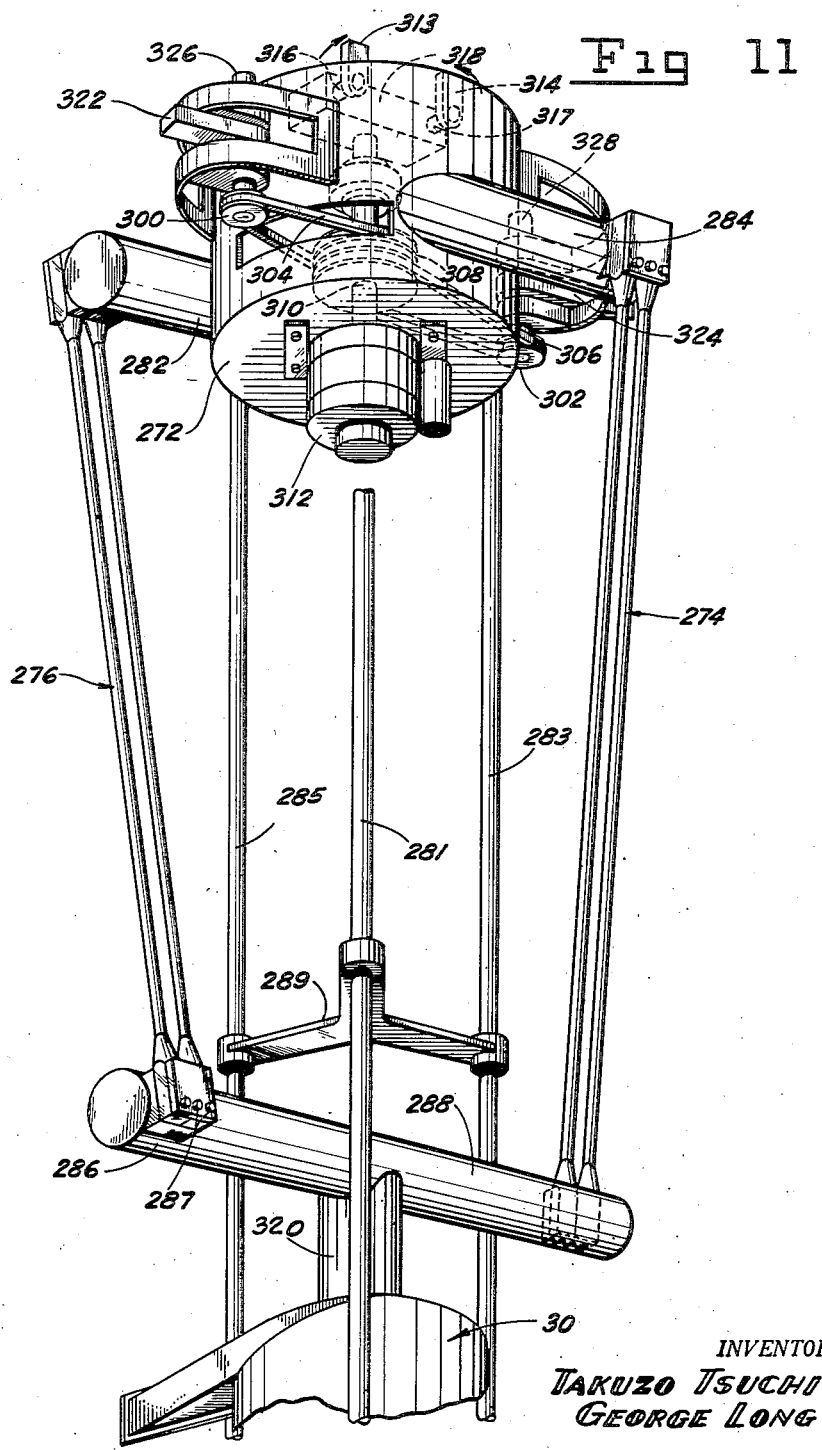

In the conveyor of Fig. 11 another manner of applying a cyclical force to the intermediate base and of obtaining a canceling vertical force is shown. In this embodiment the conveyor is shown supported in a different manner, being supported by two pairs of first spring beams 274 and 276. Each pair is comprised of two identical springs such as is shown in Fig. 8. In this construction, however, only two pairs are used being placed diametrically opposite from each other. These springs will of course have to have an individual spring constant or $k$ factor higher than where three pairs are provided to obtain a proper torsional $k$ for the system. To connect the springs to the conveyor 30, a column 320 extends from the top and is secured across tube 286 to which the first spring beams 274 and 276 connect. The connection between the springs and tube 286 is made by bolts 287 in the same manner as illustrated in Fig. 9. The springs are connected in the same manner at their upper ends to arms 282 and 284 which are welded to the intermediate base 272. Thus with this construction and the proper torsional $k$, only two sets of spring beams are necessary to support the conveyor.

The intermediate base 272 is supported from the floor by the second set of spring beams 281, 283 and 285 which are vertical steel rods and are attached at their upper ends to the intermediate base. Their lower ends which are not shown rest on a base on the floor similar to the conveyors previously described. The three rods are stabilized by a member 289 which connects the rods and prevents them from vibrating with respect to each other during operation.

For imparting a cyclical torsional force to the intermediate base and thereby obtaining movement of the conveyor, unbalanced weights 322 and 329 rotate on vertical shafts 326 and 328 respectively in the same manner as the weights in the embodiment shown in Figs. 1 and 3. These vertical shafts carry pulleys 300 and 302 at their lower ends to be driven by timing belts 304 and 306. The timing belts are driven by a double pulley 308 carried on a shaft 310 driven by the motor 312. The speed of the weights is adjusted so that they will rotate at the natural frequency of the system. The unbalanced weights, as will be seen from the driving arrangement, rotate in the same direction and are arranged so that their radial forces cancel out and the forces tangential to the conveyor axis create a torsional force about the conveyor axis.

To cancel the vertical conveyor acceleration or inertia forces which occur both when the conveyor reaches the extreme forward point of its travel and the extreme back point, a cyclical vertical force is applied by unbalanced weights 313 and 314. These weights are carried at the center of the intermediate base on shafts 316 and 317. These shafts have weights on both ends although the weights at the rear of the shafts are hidden by the case 318. The shafts driven through bevel gears within case 318 are driven by the shaft 310 which also drives the horizontal weights 322 and 324. The phase of weights 313 and 314 is so adjusted that it exerts a maximum vertical force when the torque is exerted by the weights 322 and 324.

When the conveyor has reached its maximum forward movement, moving in a clockwise direction looking upwardly in Fig. 11, the weights 322 and 324 exert a counterclockwise torque. The rotating weight 314 simultaneously exerts a vertical force in a downward direction to balance the upward force exerted by the deceleration of the conveyor as it reverses direction. When the conveyor reaches its back position, the unbalanced weight 314 exerts a force in the upward direction to compensate for the downward force caused by the conveyor in decelerating to reverse its direction.

The pairs of weights 313 and 314 rotate in opposite directions so that their horizontal forces cancel but their vertical forces add. They are balanced about the center of the intermediate base so that no forces act through the axis of the conveyor and no unbalancing couples result.

It will be seen in the embodiments shown in all the drawings that the conveyor as presented consists basically of the components including the conveyor, the first and second spring beams, the intermediate base and the cyclic force applying means. While the different embodiments shown in the drawings include combinations of elements which vary in structure, it must be understood that the elements of the various combinations shown could be combined in different combinations. For example, the unit shown in Fig. 11 uses two sets of double springs. It will be apparent from the principles taught by the present disclosure that the two sets of springs could be utilized in the embodiment of Fig. 1 instead of the flat spring beams therein used. Also elements of the embodiments shown in Figs. 1, 4 or 11 could be combined in various ways to utilize the advantages of a spiral conveyor having two masses and two sets of supporting springs.

As previously stated, the intermediate base in actual operation will have a small amount of motion due to frictional and damping losses of system. However, the amount of motion will be relatively small and will be assimilated by the second set of spring beams supporting the intermediate base and the amount of force transmitted to the supporting member, i. e., the floor or ceiling, will be practically nil.

Thus it is possible to provide a vibratory conveyor without having a supporting structure which must sustain considerable reactance forces. It will be further seen that in the embodiments of Figs. 4, 6 and 11 that a means has been provided to cancel out the vertical acceleration forces of the conveyor. In helical conveyors heretofore used, these forces have not been successfully counteracted. Thus it became necessary to provide a building and a machine frame which was sufficiently strong to assimilate these forces and in many cases the use of a vibratory conveyor was impractical. Thus by the use of a two-mass, two spring system, the forces transmitted to the supporting base have been reduced to an extremely small figure.

Thus we have made it possible for the first time to provide simple effective helical vibratory conveying action by the elimination of forces which normally are transmitted to the support. The vertical acceleration force components of the conveyor are counteracted at the intermediate base and are not transmitted to the ceiling or floor support. With this system it is of course possible because of the elimination of these undesirable forces to obtain a conveyor of a high degree of efficiency and one which can operate for a machine life that was previously unattainable. The co-pending application, Vibratory Conveyors, George Long and Takuzo Tsuchiya, United States Serial Number 329,556 illustrates a linear vibratory conveyor using a two-mass, two-spring system wherein undesirable forces have been counteracted in a horizontal vibratory conveyor.

We have, in the drawings and specification, presented a detailed disclosure of the preferred embodiments of our invention. It is to be understood that the invention is susceptible of modifications, structural changes and various applications of use within the spirit and scope of the invention and we do not intend to limit the invention to the specific form disclosed but intend to cover all modifications, changes and alternative constructions and methods falling within the scope of the principles taught by our invention.

We claim as our invention:

1. A vibratory conveyor comprising a conveying member having a spiral conveyor for conveying a solid material upwardly in a spiral path, an intermediate base member, a first set of spring beams inclined with respect to the spiral path of feed up the conveying member and the opposite ends of said first set of spring beams being connected to said conveying member and base member respectively, at least one end of each spring being rigidly connected, said first spring beams providing the sole load supporting connection for said conveying member and permitting rotary oscillations of the conveying member about its axis along an inclined path perpendicular to said beams; a second set of beams extending vertically from said base member to support the weight of the conveying member and associated apparatus, the end of said second set of beams opposite said base member having means for attachment to a support, and means applying a cyclical torque solely to said base member at a frequency relatively close to the natural frequency of the system consisting of the conveying member and first set of spring beams.

2. A vibratory conveyor comprising a conveying member arranged in a spiral for conveying solid material, an intermediate base member extending annularly around the spiral conveying member, a first set of spring beams inclined with respect to the direction of feed along the conveying member and the opposite ends of said first set of spring beams being connected to said conveying member and base member respectively, at least one end of each spring being rigidly connected, said spring beams providing the sole load supporting connection for said conveying member and permitting oscillatory vibratory motion of the conveyor member about its central axis to convey the solids, a set of vertical support spring beams extending from said base member to a suitable support to support the intermediate base and its associated apparatus, said second set of beams being provided with means for attachment to said support, and means applying a cyclical force solely to said base member at a frequency relatively close to the natural frequency of the system consisting of the conveying member and said first spring beams.

3. A vibratory conveyor comprising a helical conveyor member for conveying solids upward along a helical path, an intermediate base arranged in the form of an annular frame encircling the conveyor, a first set of spring beams inclined with respect to the direction of feed of the solids on the conveyor and having their opposite ends connected to said conveying member and said base respectively to support the conveying member from said intermediate base, a second set of spring beams extending from said base member to support the base and its associated apparatus, and means applying a cyclical torque solely to said base at substantially the frequency of the natural frequency of the system consisting of the conveying member and first spring beams.

4. A vibratory conveyor comprising a conveying member conveying a solid material spirally upward, an intermediate base member, a first set of spring beams inclined with respect to the direction of feed of the material on the conveying member and having their opposite ends connected to said conveying member and base members respectively, said spring beams providing the sole load supporting connection for said conveying member and permitting oscillatory motion about a central axis to convey the material along the conveyor, a second set of spring beams connected to the intermediate base member and to a suitable stationary support to provide a sole support for the intermediate base member and associated mechanism, and means comprising at least one unbalanced rotating member dispaced from the central axis of the conveyor applying a cyclic torque about the central axis of the conveyor solely to said intermediate base member at a frequency relatively close to the natural frequency of the system.

5. A vibratory conveyor according to claim 4 wherein the axis of the unbalanced rotating member is at an angle to the vertical axis of the conveyor so that both a horizontal and a vertical component of force will be applied to the intermediate base by the rotating member.

6. A vibratory conveyor according to claim 4 wherein the axis of the unbalanced rotating member is at an angle to the vertical axis of the conveyor and the angle is of such a degree that the vertical components of force caused by the rotation of the unbalanced member will cancel the vertical acceleration forces of the vibrating conveyor.

7. A vibratory conveyor according to claim 5 wherein the position of the axis of the unbalanced weight is adjustable to vary the ratio between the horizontal and vertical components of force created by the rotating unbalanced member for purposes of canceling varying vertical acceleration forces.

8. A vibratory conveyor according to claim 4 in which the means for applying a cyclic torque comprises rotating unbalanced weights, the axes of which are displaced from the axis of the conveyor and the angle of the axes is adjustable with respect to the conveyor axis to change the ratio between the horizontal and vertical force components created by the unbalanced weights.

9. A vibratory conveyor according to claim 4 wherein a plurality of unbalanced weights is provided comprising a pair of rotating discs on each side of the conveyor being diametrically opposed and having unbalancing weights on the edge of the discs with the pairs of discs being driven from a common cross shaft and the axes of the discs being adjustable with respect to the axis of the conveyor by rotation about their centers.

10. A vibratory conveyor comprising a spiral conveying member for carrying a solid material upwardly in a curvilinear path, an intermediate base member, a first set of spring beams inclined with respect to the direction of feed of material on the conveying member and having opposite ends connected to said base member and said conveying member respectively, said spring beams comprising the sole support for the conveying member, a second set of spring beams substantially vertical and secured to the intermediate base providing the sole connection between said base member and a suitable stationary support, and a rotating unbalanced weight rotating about a vertical axis spaced from the conveyor axis, said weight applying a cyclical torque solely to said base member at a frequency relatively close to the natural frequency of the system consisting of the conveying member and first spring beams.

11. A vibratory conveyor comprising a helical conveying member for conveying solid material up a spiral path, an intermediate base member, a first set of spring beams inclined with respect to the direction of feed on the conveying member and having their opposite ends connected to said conveying member and base member respectively and arranged about the axis of the conveying member, said springs being round in cross section to withstand the torsional stresses which occur as the conveyor rotates during vibration, a second set of spring beams secured to the base member and to a suitable supporting means to support the base member and associated mechanism, and means applying a cyclical torque solely to said base member at a frequency close to the natural frequency system consisting of the conveying member and first set of spring beams.

12. A conveyor according to claim 11 in which the ends of the round springs are larger than the centers to reduce the stress which normally occurs at the end of the spring to cause failure at that point.

13. A vibratory conveyor comprising a helical conveying member carrying a solid material from a lower to a higher level, an intermediate base member, a first set of spring beams inclined with respect to the path of material movement on the conveying member and having their opposite ends connected to said conveying member and base member respectively, said set of beams being arranged in pairs and the pairs being spaced around the axis of the conveying member, said first spring beams providing the sole load supporting connection for said conveying member and permitting oscillatory movement of the conveyor about said conveying member axis along an inclined path perpendicular to said beams, a second set of beams secured to said base member and extending to a suitable support for carrying the conveying member and associated mechanism, and means applying a cyclical torque solely to said base member at a frequency relatively close to the natural frequency of the system consisting of the conveying member and first set of spring beams.

14. A vibratory conveyor according to claim 13 in which the pairs of spring beams are arranged by the members of each pair being positioned radially of each other with respect to the helical axis of the conveyor.

15. A vibratory conveyor comprising a helical conveyor member conveying a solid material from a lower to a higher level, an intermediate base member, a first set of spring beams extending downwardly from the intermediate base member and arranged about the axis of the helical conveyor to support the conveyor, said beams being inclined to the path of feed of the solid material with at least one of the ends of the spring beams being rigidly connected, a second set of spring beams secured to the intermediate base and extending vertically to a suitable supporting member to support the base and its dependent mechanism, and means applying a cyclical torque to said intermediate base about the axis of the conveyor causing the conveyor to move in an oscillatory motion in a path at right angles to the inclination of first said spring beams, the force being applied at a frequency relatively close to the natural frequency of the system including the conveyor and first spring beams.

16. A vibratory conveyor comprising a helical conveyor member carrying material from a lower to a higher elevation, an intermediate base member, first spring beams inclined with respect to the direction of feed of the material in its helical path and connected at opposite ends to the conveyor and to the intermediate base, a second set of spring beams extending vertically from the base and attached to a suitable supporting means above the intermediate base to furnish the sole support for the conveyor and associated mechanism, and means applying a cyclical force solely to the intermediate base at a frequency relatively close to the natural frequency of the system consisting of the conveying member and first set of spring beams.

17. A vibratory conveyor comprising a helical conveying member conveying material from a lower to a higher elevation, an intermediate base member, a first set of spring beams inclined with respect to direction of feed along a helical conveyor and attached at their opposite ends to the conveying member and base member respectively, said first spring beams providing the sole load supporting connections for the conveying member and permitting oscillatory motion of the conveyor along an inclined path perpendicular to said beams, the first spring beams comprising at least two beams arranged diametrically opposite each other with respect to the axis of the helical conveyor, a second set of beams extending substantially vertical from said intermediate base to a suitable supporting member and comprising the sole support for the intermediate base, and means applying a cyclical torque about the axis of the helical conveyor at a frequency relatively close to the natural frequency of the system consisting of the conveying member and first set of spring beams.

18. A vibratory conveyor comprising a helical conveying member conveying material from a lower to a higher level, an intermediate base member, a first set of spring beams extending between the base member and conveyor to comprise the sole support for the conveyor with the opposite ends connected to the base member and conveyor respectively, said first spring beams inclined with respect to the path of feed of the conveyed material, a second set of spring beams extending vertically from the intermediate base member to a suitable support and comprising the support for the intermediate base and associated mechanism, means applying a cyclical torque to said base member about the axis of the conveying member and applying said force at a frequency relatively close to the natural frequency of the system consisting of the conveying member and first set of spring beams, said force applying means oscillating the helical conveyor about its helical axis in a path perpendicular to said first set of spring beams, and a second cyclical force applying means applying a force in a plane parallel to the helical axis and at a frequency equal to the frequency of said first cyclical force to counterbalance the vertical acceleration forces of the vibrating conveying member.

19. A vibratory conveyor comprising a helical conveying unit conveying material from a lower to a higher level, an intermediate base member, a first set of spring beams inclined with respect to the direction of feed of the material on the helical conveying unit and having their opposite ends connected to the conveying unit and base member, a second set of spring beams extending vertically from the intermediate base to a suitable support, and means mounted on the intermediate base and applying a cyclical torsional force about the axis of the helical conveyor at a frequency relatively close to the natural frequency of the system consisting of the conveying member and first set of spring beams, the force applying means comprising a pair of unbalanced weights rotating about a vertical axis at the same frequency and equally and diametrically spaced from the axis of the helical conveyor and rotating in the same direction but 180° out of phase so as to cancel forces radial to the conveyor axis and add forces tangential to the conveyor to create a torque about the conveyor axis.

20. A vibratory conveyor comprising a helical conveying unit conveying material from a lower to a higher level, an intermediate base member, a first set of spring beams inclined with respect to the direction of feed of the material on the helical conveying unit and having their opposite ends respectively connected to the conveying unit and intermediate base, said spring beams comprising the sole support for the conveying unit, a resilient support for said intermediate base and its associated mechanism and being connected between the resilient base and a suitable supporting unit, the resilient support absorbing small movements of the intermediate base cushioning the forces transmitted to said supporting unit, and means for applying a cyclical torque about the axis of the helical conveyor at a frequency relatively close to the natural frequency of the system consisting of the conveying member and a first set of spring beams, and means for applying a second cyclical force at the same frequency as said cyclical torque which is the frequency of vibration of the conveyor, said second force-applying means acting in a vertical direction to counteract the vertical acceleration forces created by the conveyor as it reverses direction during vibration.

21. A vibratory conveyor comprising a helical conveying member elevating a solid material, an intermediate base member, a set of spring beams inclined with respect to the direction of feed of the material on the conveying member and having the individual beam ends connected to the conveying unit and intermediate base member to provide the sole support for the conveying member, a support for the intermediate base extending between the base and a suitable carrying means, said support being resilient about a vertical axis coincident with the axis of the conveyor to permit torsional movement of the intermediate base, and means applying a torque about the axis of the conveyor to the intermediate base at a frequency relatively closed to the natural frequency of the system consisting of the conveying member and spring beams.

22. A vibratory conveyor comprising a helical conveying member conveying material from a lower to a higher level, an intermediate base member, a set of spring beams inclined with respect to the direction of feed of the material on the helical conveyor and arranged about the conveyor with their ends connected to the conveyor and intermediate base to comprise the sole support for the conveyor, a resilient support for the intermediate base to form the sole means of support between the base and a suitable carrying element permitting resilient movement of the base as the conveyor operates, and means mounted on the intermediate base and applying a cyclical torque about the conveyor axis at a frequency relatively close to the natural frequency of the system including the conveying member and the first set of spring beams, and rotating unbalanced weights rotating in opposite directions and having their combined center of gravity substantially at the axis of the conveyor and rotating at the frequency of the cyclical torque-applying means to apply a vertical force to cancel out the vertical forces of the conveyor as it vibrates.

23. A vibratory conveyor comprising a helical conveying unit elevating a solid material, an intermediate base member, a first set of spring beams inclined with respect to the direction of feed of the material on the conveying member and extending upwardly from the intermediate base to be secured to the conveyor and comprising the sole support for the conveyor, a second set of spring beams extending from the intermediate base to a suitable support and comprising the sole support for said base and associated mechanism, and means supported on the intermediate base and applying a cyclical torque thereto operating at substantially the natural frequency of the system consisting of the conveying member and first set of spring beams.

24. A vibratory conveyor comprising a helical conveying member for elevating material, an intermediate base member, a first set of spring beams positioned at an angle less than perpendicular to the direction of feed of the material and having their ends secured to the conveyor and the intermediate base, a second set of spring beams extending substantially vertically from the intermediate base to a suitable support, and means mounted on the intermediate base and applying a cyclical torque to the intermediate base about the axis of the conveying member, and a vertical force-applying means mounted on the intermediate base comprising at least two rotating weights rotating on horizontal axes and positioned equidistant from the center of the conveyor, means to rotate the weights in an opposite direction so that they will exert cyclic forces at the frequency of vibration of the conveyor and in a direction to exert vertical forces to cancel the vertical acceleration forces of the conveyor.

References Cited in the file of this patent

UNITED STATES PATENTS 2,658,286    Spurlin _____ Nov. 10, 1953